United States Patent
Yi et al.

(10) Patent No.: US 9,396,313 B2
(45) Date of Patent: Jul. 19, 2016

(54) APPARATUS FOR TAMPER PROTECTION OF APPLICATION CODE AND METHOD THEREOF

(71) Applicant: SOONGSIL UNIVERSITY RESEARCH CONSORTIUM TECHNO-PARK, Seoul (KR)

(72) Inventors: Jeong Hyun Yi, Gyeonggi-do (KR); Jin Hyuk Jung, Seoul (KR)

(73) Assignee: SOONGSIL UNIVERSITY RESEARCH CONSORTIUM TECHNO-PARK, Seoul (KR)

( * ) Notice: Subject to any disclaimer, the term of this patent is extended or adjusted under 35 U.S.C. 154(b) by 283 days.

(21) Appl. No.: 14/360,305

(22) PCT Filed: Sep. 30, 2013

(86) PCT No.: PCT/KR2013/008748
§ 371 (c)(1),
(2) Date: May 23, 2014

(87) PCT Pub. No.: WO2015/023024
PCT Pub. Date: Feb. 19, 2015

(65) Prior Publication Data
US 2016/0180065 A1    Jun. 23, 2016

(30) Foreign Application Priority Data
Aug. 12, 2013 (KR) .................. 10-2013-0095155

(51) Int. Cl.
*G06F 21/16* (2013.01)
*G06F 21/14* (2013.01)
*G06F 21/60* (2013.01)

(52) U.S. Cl.
CPC .............. *G06F 21/14* (2013.01); *G06F 21/602* (2013.01)

(58) Field of Classification Search
None
See application file for complete search history.

(56) References Cited

U.S. PATENT DOCUMENTS

| 8,984,299 B1 * | 3/2015 | Yi ........................ G06F 21/125 713/189 |
| 9,230,123 B2 * | 1/2016 | Yi .......................... G06F 21/14 |
| 2003/0163718 A1 * | 8/2003 | Johnson .............. G06F 12/1408 713/193 |
| 2008/0208560 A1 * | 8/2008 | Johnson ................. G06F 21/14 703/22 |

FOREIGN PATENT DOCUMENTS

| JP | 2005-072584 A | 3/2005 | |
| JP | 2005-202663 A | 7/2005 | |
| JP | 2008-164184 A | 6/2006 | |
| KR | 10-1234591 | 2/2013 | |
| KR | EP 2897072 A1 * | 7/2015 | ............. G06F 21/14 |
| KR | EP 2897074 A1 * | 7/2015 | ............. G06F 21/14 |

* cited by examiner

*Primary Examiner* — Michael R Vaughan
(74) *Attorney, Agent, or Firm* — Revolution IP, PLLC

(57) ABSTRACT

Disclosed is an apparatus for tamper protection of an application which includes: an input unit that receives codes to be used for an application; a code separator that separates the inputted codes into sensitive codes requiring application tamper protection and general codes including sensitive method calling routine for calling the sensitive codes by analyzing the input codes; an encoder that encrypts the sensitive codes and inserts the address of an sensitive code connector storing the address information of the sensitive codes; a controller that converts the sensitive method calling routine to be able to call dummy codes by inserting the dummy codes to the general codes, inserts vector table generator, to the sensitive codes, and insert a sensitive method calling routine converter, to the sensitive codes; and a code combiner that creates the application by combining the general codes and the sensitive codes.

10 Claims, 6 Drawing Sheets

FIG. 6

| vector | sensitive code to call |
|---|---|
| $V_1$ | sensitive code A |
| $V_2$ | sensitive code C |
| $V_3$ | sensitive code B |
| ⋮ | ⋮ |

APPARATUS FOR TAMPER PROTECTION OF APPLICATION CODE AND METHOD THEREOF

CROSS REFERENCE TO PRIOR APPLICATIONS

This application is a National Stage Application of PCT International Patent Application No. PCT/KR2013/008748 filed on Sep. 30, 2013, under 35 U.S.C. §371, which claims priority to Korean Patent Application No. 10-2013-0095155 filed on Aug. 12, 2013, which are all hereby incorporated by reference in their entirety.

TECHNICAL FIELD

The present invention relates to an apparatus for application code obfuscation and a method thereof, and more particularly to an apparatus for control flow obfuscation, based on a dynamic vector for protecting an android application, and a method thereof.

BACKGROUND ART

The existing application obfuscation apparatuses and methods for Java language obfuscate applications that operate in a java virtual machine by changing the code structure of the applications. The obfuscated applications are composed of a group of commands and an object file that operate in a java virtual machine in the same way before the obfuscation.

In the existing obfuscation apparatuses and methods, however, there is a problem in that the vulnerability to reverse engineering of the managed code that operates in a virtual machine remains even after obfuscation.

The vulnerability to reverse engineering of the managed code is as follows. Source code information such as the class name, the member variable name, and the method name is included in a complied object code and the code is explicitly structurized, such that it is easy to find or analyze a specific logic through reverse engineering.

Android applications, similar to the applications that operate in a java machine, are also composed of managed codes that operate in a dalvik virtual machine, and are stored in a DEX (dalvik executable) file type. Accordingly, the android applications also have vulnerability to reverse engineering of the managed code, similar to the java applications.

The background art of the present invention has been described in Korean Patent Registration Publication No. 10-1234591 (2013, 2, 19).

DISCLOSURE

Technical Problem

An object of the present invention is to provide an apparatus for control flow obfuscation, based on a dynamic vector for protecting an android application and a method of control flow obfuscation.

Technical Solution

An apparatus for tamper protection of an application according to an embodiment of the present invention includes: an input unit that receives codes to be used in an application; a code separator that separates the inputted code into sensitive codes requiring application tamper protection and general codes including calling codes for calling the sensitive codes; a code converter that converts the sensitive code into the format of a native code; an encoder that encrypts the sensitive codes and inserts the address of a sensitive code connector storing the address information of the sensitive codes; a controller that separates the calling codes from the general code and registers the calling codes on a management server, and adds a calling code loading routine for requesting the calling codes and a vector table loading routine for requesting a vector table including vector information of the called sensitive codes; and a code combiner that creates an application by combining the obfuscated general codes with the sensitive codes.

The apparatus may further include: a first compiler that compiles the sensitive codes added with the calling code loading routine and the vector table loading routine under a native environment; and a second compiler that creates an execution file by compiling the general codes with the calling codes separated, under a managed environment.

The apparatus may further include a scrambler that scrambles sensitive identifiers defined in the sensitive codes and the general codes by replacing the sensitive identifiers with meaningless characters or character strings and by replacing general identifiers defined in the general codes with meaningless characters or character strings.

When a client receiving the application executes the application, using a startup routine and the client request the vector table and the calling codes to the management server with execution of the vector table loading routine and the calling code loading routine, the client may receive a vector table showing dynamic vectors corresponding to the sensitive codes, respectively, and calling codes with the dynamic vectors applied, from the management server.

The sensitive code connector may call and execute a sensitive code corresponding to a calling code with a dynamic vector applied, using the address information of the vector table received from the management server and the stored sensitive code.

A method of tamper protection of an application which uses an apparatus for tamper protection of an application according to another embodiment includes: receiving codes to be used in an application; separating the inputted code into sensitive codes requiring application tamper protection and general codes including calling codes for calling the sensitive codes; converting the sensitive code into the format of a native code; encrypting the sensitive codes and inserting the address of a sensitive code connector storing the address information of the sensitive codes; separating the calling codes from the general code and registering the calling codes on a management server, and adding a calling code loading routine for requesting the calling codes and a vector table loading routine for requesting a vector table including vector information of the called sensitive codes; and creating an application by combining the obfuscated general codes with the sensitive codes.

Advantageous Effects

According the apparatus and method for tamper protection of an application of the present invention, it is possible to compensate vulnerability to reverse engineering of a managed code by converting a sensitive code in the codes of an application into a native code and performing encryption of a code protection scheme based of self modification on the converted sensitive code. Accordingly, it is possible to increase security against forgery of an application.

Further, since the control flow is changed by a dynamic vector and a calling code for calling a sensitive code converted into a native code and a vector table connecting the calling code are separately managed to be dynamically loaded when an application is executed, it is possible to enhance reverse engineering analysis resistance.

DESCRIPTION OF DRAWINGS

FIG. 6 is a diagram illustrating a vector table.

Figure 1:
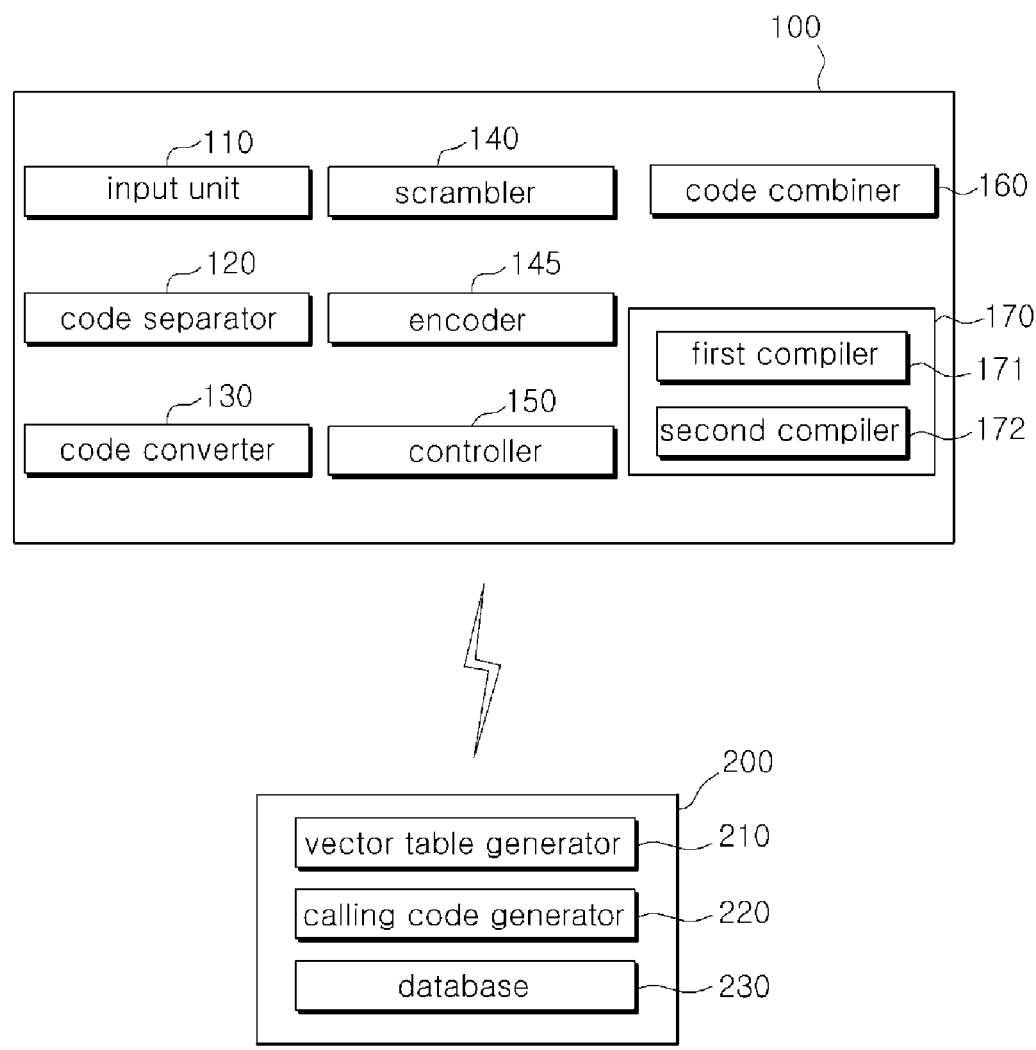
FIG. 1 is a diagram showing the configuration of an apparatus for application obfuscation according to an embodiment of the present invention.

| [Description of Main Reference Numerals of Drawings] | |
|---|---|
| 100: apparatus for application obfuscation | 110: input unit |
| 120: code separator | 130: code converter |
| 140: scrambler | 145: encoder |
| 150: controller | 160: code combiner |
| 170: compiler | 171: first compiler |
| 172: second compiler | 200: management server |
| 210: vector table generator | 220: calling code generator |
| 230: database | |

BEST MODE

Embodiments of the present invention will be described in detail with reference to the accompanying drawings for those skilled in the related art to easily achieve the present invention. However, the present invention may be achieved in various different ways and is not limited to the embodiments described herein. In the accompanying drawings, portions unrelated to the description will be omitted in order to obviously describe the present invention, and similar reference numerals will be used to describe similar portions throughout the present specification.

An apparatus for application obfuscation of the present invention is described first.

FIG. 1 is a diagram illustrating an apparatus for application obfuscation according to an embodiment of the present invention.

Referring to FIG. 1, an apparatus 100 for application obfuscation includes an input unit 110, a code separator 120, a code converter 130, a scrambler 140, an encoder 145, a controller 150, and a code combiner 160, and may further include a compiler 170.

First, the input unit 110 receives the codes of an application. The inputted codes, which are codes for creating an application, may be codes in the format of a source code or a managed code.

The code separator 120 separates the codes inputted through the input unit 110 into sensitive codes requiring application tamper protection and general codes except for the sensitive codes by analyzing the input codes.

The code converter 130 converts the sensitive codes separated by the code separator 120 from a managed code into a native code.

The scrambler 140 scrambles sensitive identifiers defined in the sensitive codes and the general codes by replacing the sensitive identifiers with meaningless characters or character strings.

The controller 150 separates calling codes from the general codes and transmits and registers the separated calling codes to a management server 200, after the general codes and the sensitive codes are separated by the code separator 120. The controller 150 adds a calling code loading routine and a vector table loading routine to a library loading routine region.

The calling code loading routine is a routine for requesting a calling code and the vector table loading routine is a routine for requesting a vector table including the vector information of the called sensitive codes.

The code combiner 160 creates a combined file that can be distributed to clients by combining the encrypted general codes and sensitive codes. As an embodiment of the present invention, for android applications, the files with an extension of apk (Android package) are the combined files.

The complier 170 may include a first compiler 171 operating under a managed environment to compile general codes and a second compiler 172 operating under a native environment to compile sensitive files.

The first compiler 171 compiles sensitive codes added with a calling code loading routine and a vector table loading routine in a native environment. The second compiler 172 creates an execution file by compiling general codes with the calling codes separated, in a managed environment.

The management server 200 includes a vector table generator 210, a calling code generator 220, and a database 230. The management server 200 may be an independent server discriminated from the apparatus 100 for application obfuscation or may be one of the components of the apparatus 100 for application obfuscation.

The management server 200 receives calling codes corresponding to sensitive codes from the apparatus 100 for application obfuscation and registers and manages them on the database 230.

Since there is no vector information in the calling codes from the apparatus 100 for application obfuscation, a vector table generator 310 makes a vector table by the request of a client and a calling code generator 320 creates calling codes with dynamic vectors with reference to the vector table. That is, the calling code generator 320 completes a calling code by adding a dynamic vector to a calling code of a basic template type.

A method of application obfuscation according to an embodiment of the present invention is described hereafter.

Figure 2:
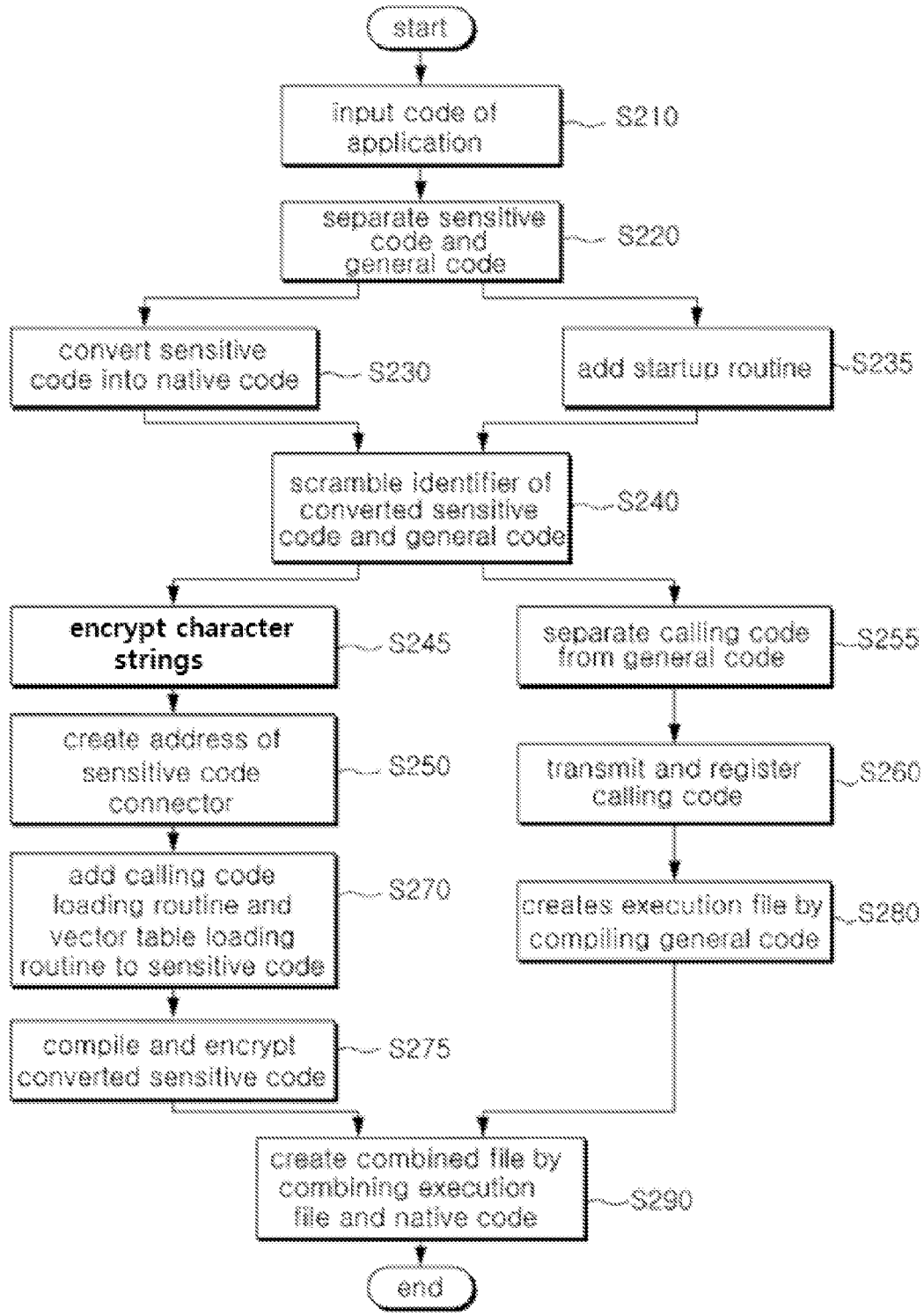
FIG. 2 is a flowchart illustrating a method of application obfuscation according to an embodiment of the present invention.

FIG. 2 is a flowchart illustrating a method of application obfuscation according to an embodiment of the present invention.

The input unit 110 receives the code of an application (S210). The input unit may have an input interface, in a type of keypads. The input codes may be source codes or codes in the format of the managed code that can be executed in a JVM (Java Virtual Machine) or a DVM (Dalvik Virtual Machine).

The code separator 120 separates the codes inputted through the input unit 110 into sensitive codes requiring application tamper protection and general codes except for the sensitive codes by analyzing the input codes (S220).

The general codes include a calling routine that can call sensitive codes or native codes converted from sensitive codes in a general code region. The sensitive codes mean the codes requiring tamper protection against a hacker in the side of the user. The codes except for the sensitive codes are called general codes, in opposite conception to the sensitive codes. A core code may be used as a synonym of the sensitive code.

For the code classification, the code separator 120 may determine the codes matching with sensitive code models in the inputted execution codes as sensitive codes, using stored sensitive code models.

The code converter 130 converts the sensitive codes separated by the code separator 120 from a managed code into a native code (S230). That is, the code converter 130 converts sensitive codes in the format of a managed code into the formation of a native code. The native code is a code that is closer to a binary code than a manage code and executed in a CPU environment, unlike the managed code that is executed in a JVM or DVM.

As an embodiment of the present invention, the code converter 130 can convert a sensitive code into a C code. Accordingly, the 'sensitive code' may be used as a synonym of the native code or the C code herein.

The sensitive code is stored in an ELF (Executable and Linkable Format) in a native code section. The code structure of the ELF is not clearly discriminated, such that it has an advantage that it is not relatively easily exposed to dynamic analysis or static analysis for code forgery in comparison to the DEX format. Further, the ELF is composed of CPU commands at a low level close to the mechanical language in comparison to Dalvik commands, such that a hacker has difficulty in dynamic analysis and static analysis.

The code converter 130 may add a startup routine to be loaded with a sensitive code to a general code (S235). As an embodiment of the present invention, the startup routine may include a JNI (Java Native Interface) function.

The scrambler 140 scrambles sensitive identifiers defined in the sensitive codes and the general codes by replacing the sensitive identifiers with meaningless characters or character strings (S240). The scramble identifier is a kind of arrangement obfuscation that makes reverse engineering difficult by changing the identifier in a code into one or more series of letters.

Figure 3:
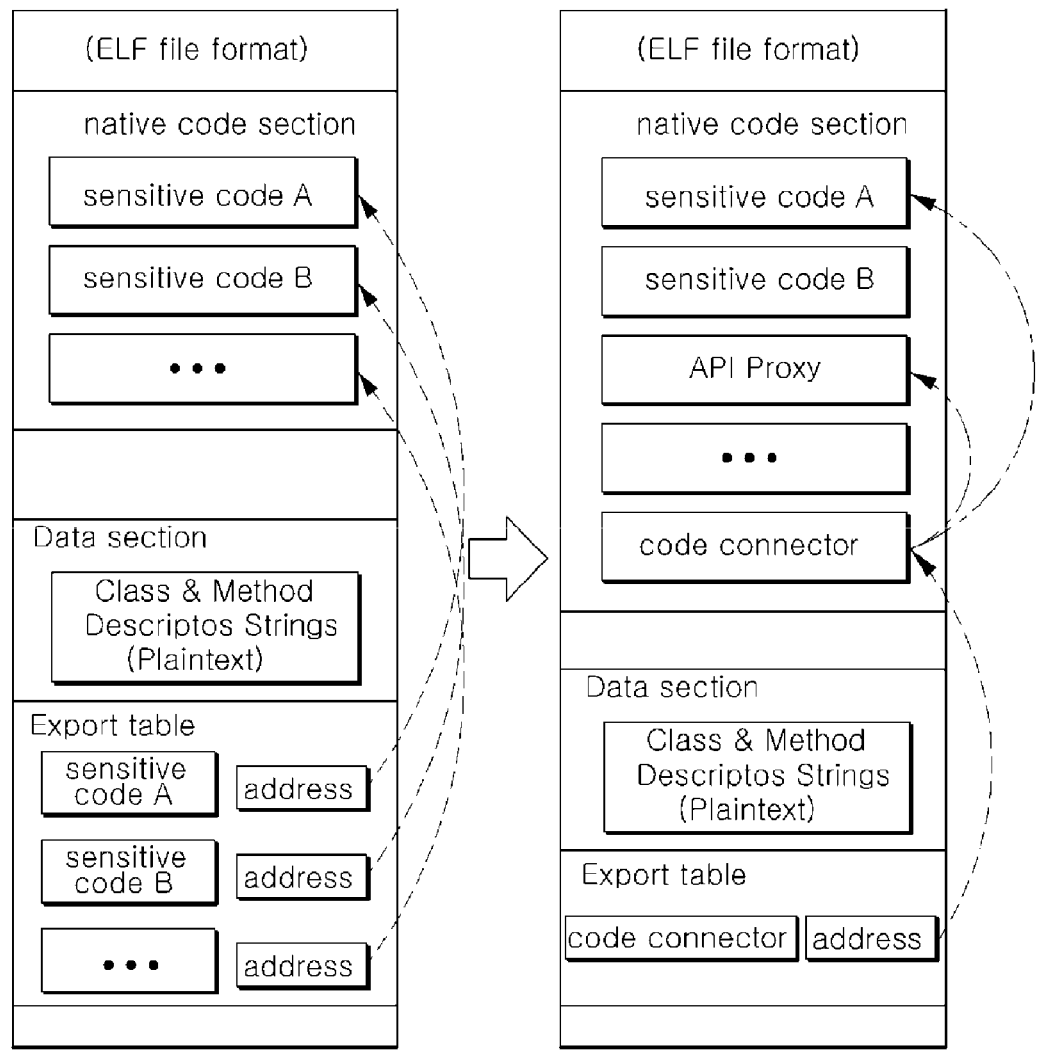
FIG. 3 is a diagram illustrating the file structure of a sensitive code according to an embodiment of the present invention.

A sensitive code that has undergone the scrambling, as in S240, has the native file structure, as in the left one in FIG. 3.

FIG. 3 is a diagram illustrating the file structure of a sensitive code according to an embodiment of the present invention.

That is, referring to the left one in FIG. 3, an export table includes the addresses of a plurality of sensitive codes (sensitive code A, sensitive code B, . . . ) and the addresses correspond to the sensitive codes (sensitive code A, sensitive code B, . . . ), respectively, which are stored in the type of a library in a native code section.

Next, the encoder 145 encrypts character strings (S245). That is, the encoder 145 can encrypt character strings by performing data obfuscation schemes such as a data storage conversion, data encoding conversion, and data ordering conversion on the character strings in the sensitive codes under a native environment.

The encoder 145 creates a sensitive code connector in a code type in the native code section, as in the right one in FIG. 3, and the sensitive code connector includes address information on native codes defined in the export table at the left one in FIG. 3.

The encoder 145 creates the address of the sensitive code connector, as in the right one in FIG. 3, by merging the addresses of the native codes defined in the export table at the left one in FIG. 3.

Accordingly, as in the right one in FIG. 3, address information showing the position of the sensitive code connector is stored in the export table.

Next, the controller 150 separates a calling code from a general code (S255) and transmits and register the separated calling code on the management server 200 (S260). The calling code separated from the general code is transmitted in a basic template type with the vector for matching a sensitive code and is stored on the database 230 of the management server.

The controller 150 adds a calling code routine for requesting a calling code and a vector loading routine for requesting a vector table including the vector information of the called sensitive code when an application is executed, to the library loading routine region of sensitive codes (S270).

Next, the first compiler 171 compiles the sensitive code added with the calling code loading routine and the vector table loading routine and the encoder 145 can encrypt a binary code by applying a code protection scheme based on self modification to the compiled sensitive code (S275).

The second compiler 172 creates an execution file by compiling a general code under the managed environment (S280). As an embodiment of the present invention, the execution file is a file operating in a JVM or DVM, in detail, it is a DEX file. The combiner 160 creates an obfuscated application in the format of a combined file by combining an execution file with a native code (S290). The application created by the combiner 160 is transmitted to a client terminal A process of executing an application by means of a client receiving the application is described with reference to FIGS. 4 to 6.

Figure 4:
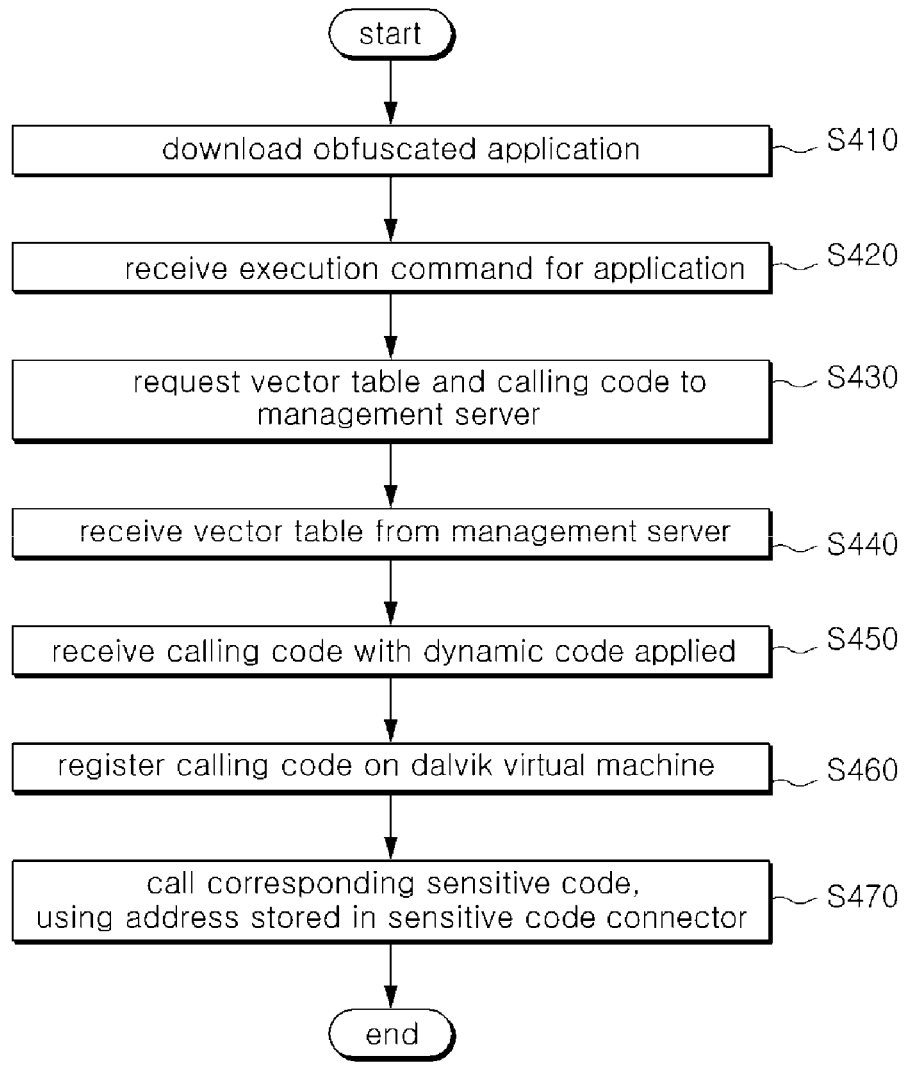
FIG. 4 is a flowchart illustrating a process of executing an application by means of a client terminal according to an embodiment of the present invention.
Figure 5:
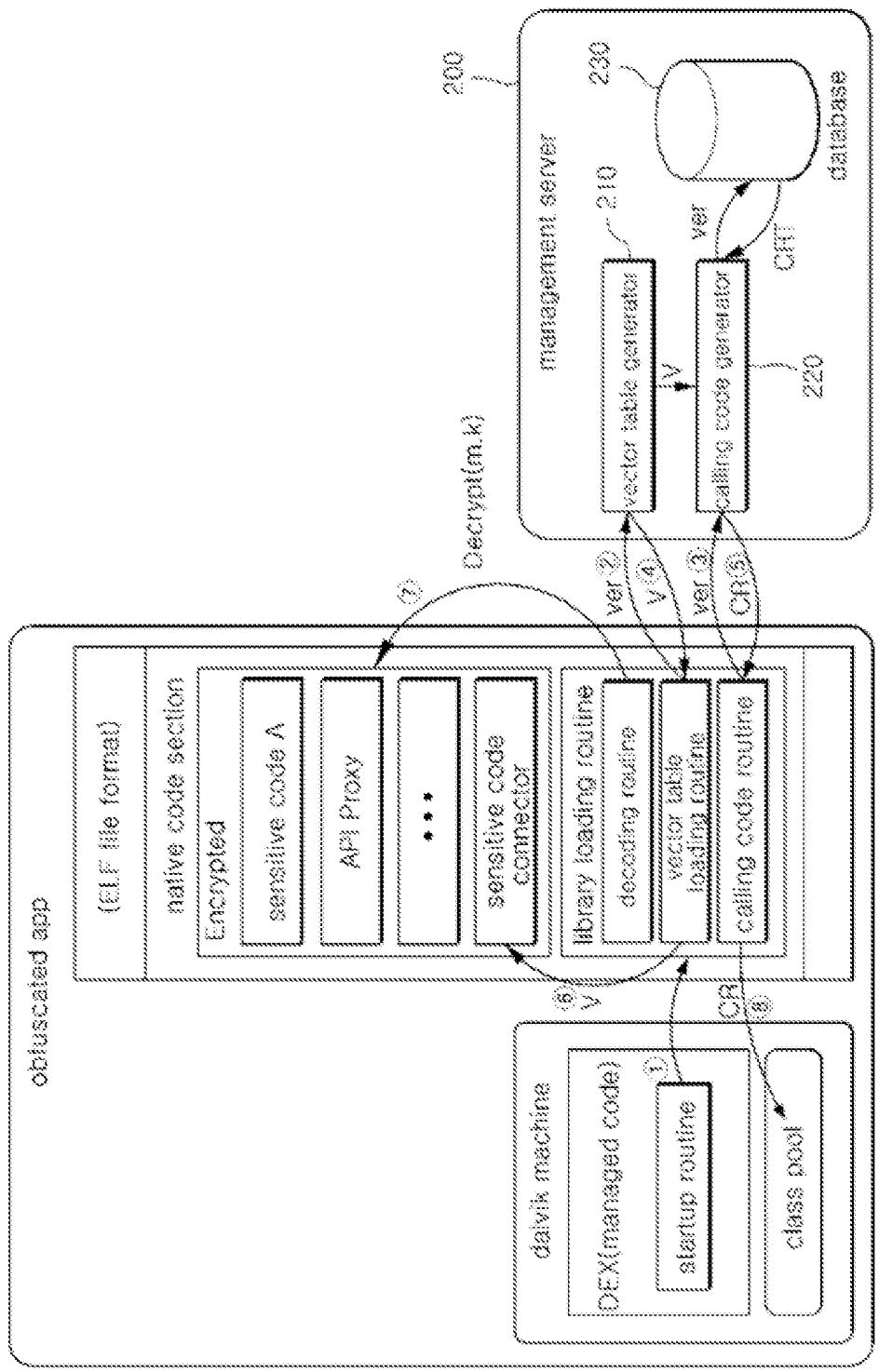
FIG. 5 is a diagram illustrating a process of receiving a vector table and a calling code from a management server by means of a client terminal.

FIG. 4 is a flowchart illustrating a process of executing an application by means of a client according to an embodiment of the present invention and FIG. 5 is a diagram illustrating a process of receiving a vector table and a calling code from a management server by means of a client terminal FIG. 6 is a diagram illustrating a vector table.

A client terminal, first, receives and downloads an obfuscated application through an android market or an app store (S410).

Then the obfuscated application is installed in the client terminal, as in the left one in FIG. 5. The obfuscated application is divided into a general code section that operations in a dalvik virtual machine and a sensitive code section of ELF that operates under the native environment.

That is, a DEX file that is an android execution file obtained by compiling a general code is executed in a dalvik virtual machine (DVM) and the sensitive code of the native format is executed in a CPU. Encrypted sensitive codes and a sensitive code connector are stored in the type of a library in the native code section and the library loading routine includes a decoding routine, a vector table loading routine, and a calling code loading routine.

When a user executes the downloaded application (S420), the controller (not shown) of the client loads the DEX file in the application onto a dalvik virtual machine (DVM), using the startup routine. Further, an interface routine is executed with the DEX file loaded and the converted sensitive code is loaded on the memory region controlled by a CPU.

The startup routine calls the vector table loading routine in the native region and transmits the identification information (version information of the application) to the management server. The vector table loading routine requests the vector table generator 210 in the management server to make a vector table and the calling code generator 220 to make a calling code (S430).

The management server 200 requested to make a vector table by the vector table loading routine creates a vector table, as in FIG. 6, with reference to the identification information and transmits it to the client (S440).

The vector table is a table obtaining by matching dynamic vectors with sensitive codes to be called and the vector table generator 210 can change at any time the sensitive codes to be matched with dynamic vectors. That is, the dynamic vectors shown in FIG. 6 are matched with sensitive codes to be called, respectively. In the vector table shown in FIG. 6, it is exemplified that the dynamic vector $V_1$ is matched with the sensitive code A, the dynamic vector $V_2$ is matched with the sensitive code C, the dynamic vector $V_3$ is matched with the sensitive code B.

Next, the management server 200 requested to create calling codes by the calling code loading routine creates a calling code with a dynamic vector applied, with reference to the vector table and transmits it to the client (S450). That is, the calling code stored in the database 230 has no dynamic vector section, and accordingly, the calling code generator 220 applies a dynamic vector corresponding to a sensitive code to the calling code on the basis of the vector table and then transmits the calling code with the dynamic vector applied, to the client.

The client receiving the calling code with a dynamic code applied registers the received calling code on the dalvik virtual machine (S460). That is, the calling code can operate only in the dalvik virtual machine, so the client registers it on a class pool.

For example, when the management server 200 is requested to create a calling code from the controller (not shown) of a client, the calling code generator 220 inserts a dynamic vector corresponding to a sensitive code into a stored calling code with reference to the vector table and then transmits it to the client.

The controller (not shown) of the client receiving a vector table and a calling code with a dynamic vector applied checks which sensitive code the dynamic vector indicates with reference to the vector table and calls and executes the corresponding sensitive code (S470).

For example, when the dynamic vector $V_2$ is applied to the calling code, the client can find out that the corresponding calling code is the sensitive code C with reference to the vector table. Accordingly, the address of the sensitive code C is found out through the sensitive code connector and the sensitive code C loaded on the corresponding address is called and executed.

As described above, according to an embodiment of the present invention, a calling code uses a dynamic vector that controls calling flow, in order to resistance against reverse engineering of the control flow between a converted sensitive code and a calling code for calling the sensitive code. The dynamic vector connects the calling code with the converted sensitive code and is used as a parameter of the calling code.

If the calling code is statically used, a hacker can analyze the control flow only with static analysis, such that the calling code and the vector table are created in the management server to preclude static analysis by a hacker in an embodiment of the present invention.

The calling code and the vector table mapping the calling code, which are created in the management server 200, are received from the management server 200, dynamically loaded on the memory of a client, and the executed, when the application is executed. Accordingly, a hacker has difficulty in static analysis, because there is no information on the converted sensitive code and the calling code for calling the sensitive code before the client executes the application.

The configurations simply or not stated in the above description, for example, the detailed process of encrypting a code or the process of decoding an encrypted code by means of a decrypt routine are well known in the related art and not described herein.

According to an embodiment of the present invention, it is possible to compensate vulnerability to reverse engineering of a managed code by converting a sensitive code in the codes of an application into a native code and performing encryption of a code protection scheme based of self modification on the converted sensitive code. Accordingly, it is possible to increase security against forgery of an application.

Further, since the control flow is changed by a dynamic vector and a calling code for calling a sensitive code converted into a native code and a vector table connecting the calling code are separately managed to be dynamically loaded when an application is executed, it is possible to enhance reverse engineering analysis resistance.

The present invention was described on the basis of embodiment. Those skilled in the related art may understand that various modifications may be made without departing from the scope of the present invention. Accordingly, it should be noted that the examples are provided not to limit, but to explain the present disclosure. Accordingly, the present invention should be construed as including various embodiments within the claims and the equivalent range without being limited to the embodiments described above.

The invention claimed is:

1. An apparatus for tamper protection of an application, comprising:
    an input unit that receives inputted codes to be used in an application;
    a code separator that separates the inputted codes into sensitive codes requiring application tamper protection and general codes including calling codes for calling the sensitive codes;
    a code converter that converts the sensitive code into the format of a native code;
    a scrambler that performs scramble identifier obfuscation on the converted sensitive codes and the general codes;
    an encoder that encrypts the converted sensitive codes and inserts the address of a sensitive code connector storing the address information of the converted sensitive codes;
    a controller that separates the calling codes from the general code and registers the calling codes on a management server, and adds a calling code loading routine for requesting the calling codes and a vector table loading routine for requesting a vector table including vector information of the called sensitive codes; and
    a code combiner that creates an application by combining the obfuscated general codes with the converted sensitive codes.

2. The apparatus of claim 1, further comprising:
    a first compiler that compiles the converted sensitive codes added with the calling code loading routine and the vector table loading routine under a native environment; and
    a second compiler that creates an execution file by compiling the general codes with the calling codes separated, under a managed environment.

3. The apparatus of claim 2, the scrambler further scrambles sensitive identifiers defined in the converted sensitive codes and the general codes by replacing the sensitive identifiers with meaningless characters or character strings.

4. The apparatus of claim 3, wherein when a client receiving the application executes the application, using a startup routine and the client request the vector table and the calling codes to the management server with execution of the vector table loading routine and the calling code loading routine, the client receives a vector table showing dynamic vectors corresponding to the converted sensitive codes, respectively, and calling codes with the dynamic vectors applied, from the management server.

5. The apparatus of claim 4, wherein the sensitive code connector calls and executes a respective converted sensitive code corresponding to a respective calling code with a dynamic vector applied, using the address information of the vector table received from the management server and the stored sensitive code.

6. A method of tamper protection of an application which uses an apparatus for tamper protection of an application, the method comprising:
- receiving inputted codes to be used in an application;
- separating the inputted codes into sensitive codes requiring application tamper protection and general codes including calling codes for calling the sensitive codes;
- converting the sensitive code into the format of a native code;
- performing scramble identifier obfuscation on the converted sensitive codes and the general codes;
- encrypting the converted sensitive codes and inserting the address of a sensitive code connector storing the address information of the converted sensitive codes;
- separating the calling codes from the general code and registering the calling codes on a management server, and adding a calling code loading routine for requesting the calling codes and a vector table loading routine for requesting a vector table including vector information of the called sensitive codes; and
- creating an application by combining the obfuscated general codes with the converted sensitive codes.

7. The method of claim 6, further comprising compiling the converted sensitive codes added with the calling code loading routine and the vector table loading routine under a native environment; and creating an execution file by compiling the general codes with the calling codes separated, under a managed environment.

8. The method of claim 7, further comprising scrambling the sensitive identifiers defined in the sensitive codes and the general codes by replacing the sensitive identifiers with meaningless characters or character strings.

9. The method of claim 8, wherein when a client receiving the application executes the application, using a startup routine and the client request the vector table and the calling codes to the management server with execution of the vector table loading routine and the calling code loading routine, the client receives a vector table showing dynamic vectors corresponding to the converted sensitive codes, respectively, and calling codes with the dynamic vectors applied, from the management server.

10. The method of claim 9, wherein the sensitive code connector calls and executes a respective converted sensitive code corresponding to a respective calling code with a dynamic vector applied, using the address information of the vector table received from the management server and the stored sensitive code.

* * * * *